Jan. 24, 1928.
B. C. BECKER
1,656,971
LEAD FOR LEAD PENCILS
Filed March 3, 1921
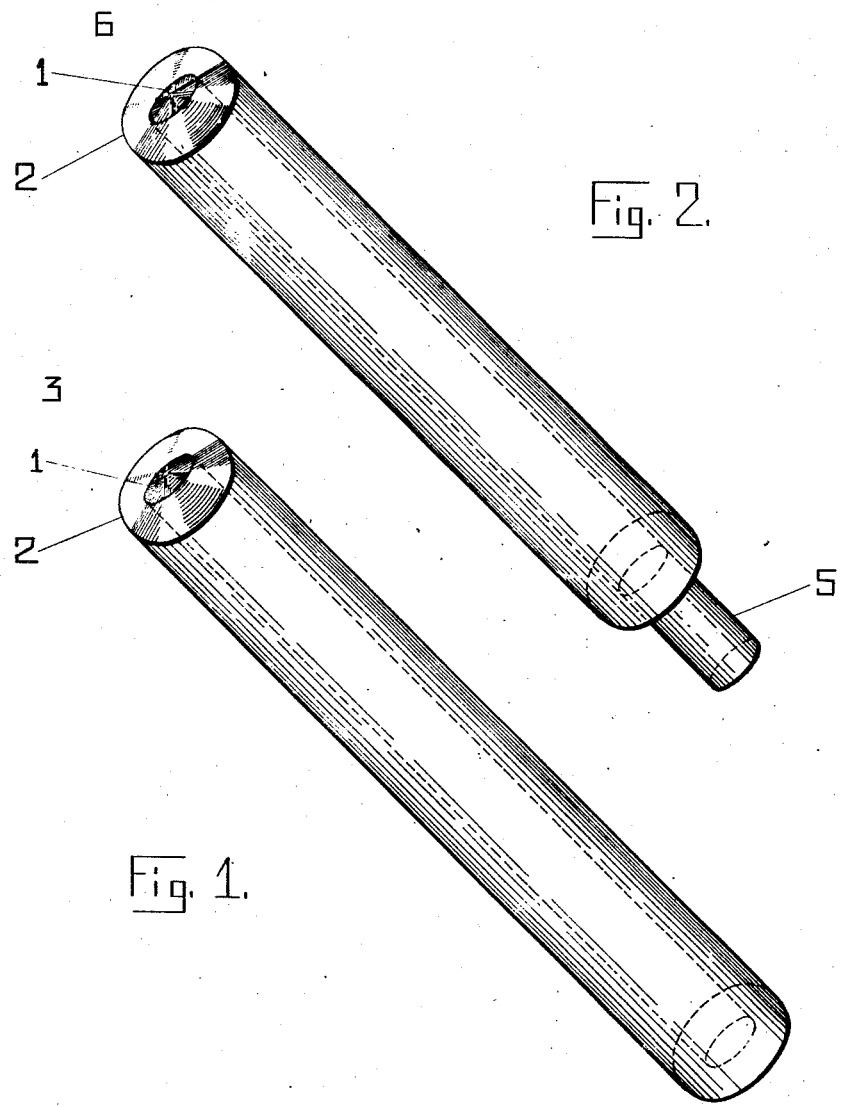
WITNESSES:
F. E. Hartman
F. S. Baker
INVENTOR
Bernard C. Becker
BY
ATTORNEY Patented Jan. 24, 1928.

1,656,971

UNITED STATES PATENT OFFICE.

BERNARD C. BECKER, OF ROME, NEW YORK.

LEAD FOR LEAD PENCILS.

Application filed March 3, 1921. Serial No. 449,300.

Recognizing that leads of very small diameter are impracticable for writing purposes, on account of not having sufficient strength to resist breakage under the strain of normal writing pressure; the object of this invention is to utilize leads of exceptionally small diameter, and reenforce the same to prevent breaking thereof.

In carrying out this invention, I provide a sheathing which covers the lead, and which consists of a material having substantially the same characteristics as the lead, except that it will not produce writing. This sheathing serves to reenforce the lead and prevents breaking thereof.

This invention will be more fully understood from the following description, taken in connection with the accompanying drawing, forming part hereof, and in which similar numerals refer to similar parts throughout the several views.

Figure 1 is a perspective view of the article forming the subject matter of this invention.

Fig. 2 is a perspective view of the article forming the subject matter of this invention, and is a modification of the article shown in Fig. 1.

Referring to Figure 1, 1 represents the lead and may be composed of graphite or any other material suitable for producing writing. 2 represents the sheathing and may be composed of any material having substantially the same characteristics as graphite, except that of producing writing; the wall thickness should be such so that the joint strength of the sheathing and lead will be equal to that in the lead of an ordinary lead pencil. The sheathing 2 is attached to the lead 1 in any manner whereby they form one single unit. The lead must be exposed at one end like shown at 3 so that it can be brought in contact with the surface upon which it is intended to produce writing, and the sheathing should extend to a point practically flush with the end of the lead so that it also comes in contact with the surface upon which it is intended to produce writing.

The end 4 of the lead may or may not be covered with the sheathing material, but at least one end as at 3 must be exposed before writing can be produced.

In the modification shown in Fig. 2, the reduced diameter 5 forms a shank which provides a convenient means through which the lead may be held in mechanical pencils to prevent the same from falling out, or to prevent the same from turning in the lead carrying socket.

There are various methods for manufacturing this article, for instance the sheathing may be formed in a plastic state and molded with the lead by forcing both materials simultaneously through a die; or the sheathing may be made separately in the form of a tube after which it is shrunk around the lead, or it may be cemented to the lead; or in some cases it is probable that a metal might be electroplated to the lead, and afterwards changed by a suitable chemical process to one of its compounds, such as the oxide of the metal or the like, or especially treated in some other manner to produce a sheathing having the necessary characteristics.

As a material for the sheathing when used in conjunction with the ordinary graphite lead, I have obtained good results by mixing powdered talc with sodium silicate, castor oil and water, forming a paint like solution, applying it to the lead by dipping one or more times and baking the same by the application of heat. I find that the sodium silicate forms a superficial glaze on the surface of the sheathing which is harder than the internal portions thereof; this forms an exceptionally stiff casing which supports the internal portions of the sheathing, and the lead. This superficial glaze of course aids materially in resisting lateral crushing strains as well as bending strains; it is so thin that it readily breaks away in very fine portions when subjected to rubbing contact with paper and thus exposes the softer internal portions of the sheathing which easily disintegrates and wears away in a smooth easy manner. If water alone is mixed with the talc no superficial coating or glaze is formed and the sheathing is homogeneous throughout, but it is somewhat too soft and not very satisfactory with a lead composed of graphite and its usual combinations, it is more appropriate for the crayons and wax leads, and in this connection it might be stated that the ordinary crayon material or the ordinary wax lead material may be incorporated in this article in the form of a fine central core with the sheathing serving as a supporting element, under which circumstances fine lines in these materials can readily be produced.

Having thus described my invention, what I claim, and desire to secure by Letters Patent, is as follows:

1. A lead pencil lead comprising a marking element capable of producing a visible line on paper, and a sheathing consisting of a hard material which will wear away at substantially the same rate as said marking element when subjected to rubbing contact with said paper, and which is ineffective in producing a noticeable line on said paper.

2. A lead pencil lead comprising a marking element capable of producing a visible line on paper, a sheathing consisting of a material which will wear away at substantially the same rate as said marking element when subjected to rubbing contact with said paper, and which is ineffective in producing a noticeable line on said paper, and a superficial glaze on said sheathing which will disintegrate through rubbing contact with said paper in unison with the wearing away of said sheathing.

In testimony whereof I have signed my name to this specification.

BERNARD C. BECKER.